United States Patent
Ju et al.

(10) Patent No.: US 9,066,013 B2
(45) Date of Patent: Jun. 23, 2015

(54) CONTENT-ADAPTIVE IMAGE RESIZING METHOD AND RELATED APPARATUS THEREOF

(71) Applicant: MEDIATEK INC., Hsin-Chu (TW)

(72) Inventors: Chi-Cheng Ju, Hsinchu (TW);
Ding-Yun Chen, Taipei (TW);
Cheng-Tsai Ho, Taichung (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 71 days.

(21) Appl. No.: 13/891,201

(22) Filed: May 10, 2013

(65) Prior Publication Data

US 2013/0315499 A1    Nov. 28, 2013

Related U.S. Application Data

(60) Provisional application No. 61/651,499, filed on May 24, 2012.

(51) Int. Cl.
| | |
|---|---|
| *G06K 9/32* | (2006.01) |
| *G06K 9/40* | (2006.01) |
| *G06K 15/02* | (2006.01) |
| *H04N 1/46* | (2006.01) |
| *H04N 5/232* | (2006.01) |
| *G06T 3/40* | (2006.01) |
| *G06T 5/00* | (2006.01) |
| *H04N 9/79* | (2006.01) |
| *H04N 5/77* | (2006.01) |
| *G06T 7/00* | (2006.01) |

(52) U.S. Cl.
CPC .......... *H04N 5/23248* (2013.01); *G06T 3/4023* (2013.01); *G06T 3/4007* (2013.01); *G06T 3/4053* (2013.01); *G06T 2207/20192* (2013.01); *G06T 3/40* (2013.01); *H04N 5/23222* (2013.01); *H04N 5/23293* (2013.01); *G06T 5/003* (2013.01); *H04N 9/79* (2013.01); *H04N 5/772* (2013.01); *G06T 7/0002* (2013.01); *G06T 2207/10016* (2013.01); *G06T 2207/30168* (2013.01); *G06T 2207/30201* (2013.01); *H04N 5/23254* (2013.01)

(58) Field of Classification Search
CPC ....... G06T 3/40; G06T 3/4007; G06T 3/4023; G06T 3/4053; G06T 2207/20192; H04N 1/40068
USPC .......... 382/284, 298, 299, 300; 345/660, 670, 345/671; 358/1.2, 528
See application file for complete search history.

(56) References Cited

U.S. PATENT DOCUMENTS

| | | | | |
|---|---|---|---|---|
| 6,058,248 | A * | 5/2000 | Atkins et al. | 358/1.2 |
| 7,269,300 | B2 * | 9/2007 | Braun et al. | 382/298 |
| 7,545,391 | B2 * | 6/2009 | Le Dinh et al. | 345/660 |
| 8,294,748 | B2 * | 10/2012 | Stec et al. | 348/36 |
| 8,373,802 | B1 * | 2/2013 | Gross et al. | 348/700 |
| 8,787,728 | B2 * | 7/2014 | Maruyama et al. | 386/232 |
| 2001/0012072 | A1 | 8/2001 | Ueno | |

(Continued)

*Primary Examiner* — Kanjibhai Patel
(74) *Attorney, Agent, or Firm* — Winston Hsu; Scott Margo

(57) ABSTRACT

An image resizing method includes at least the following steps: receiving at least one input image; performing an image content analysis upon at least one image selected from the at least one input image to obtain an image content analysis result; and creating a target image with a target image resolution by scaling the at least one input image according to the image content analysis result, wherein the target image resolution is different from an image resolution of the at least one input image.

22 Claims, 11 Drawing Sheets

(56) References Cited

U.S. PATENT DOCUMENTS

| | | |
|---|---|---|
| 2003/0160886 A1 | 8/2003 | Misawa |
| 2007/0140675 A1 | 6/2007 | Yanagi |
| 2008/0024643 A1 | 1/2008 | Kato |
| 2008/0259274 A1 | 10/2008 | Chinnock |
| 2010/0110300 A1 | 5/2010 | Ueno |
| 2010/0215348 A1 | 8/2010 | Saito |
| 2011/0149029 A1 | 6/2011 | Kellerman |
| 2011/0301980 A1 | 12/2011 | Martucci |
| 2012/0019677 A1 | 1/2012 | Wong |
| 2013/0300900 A1 | 11/2013 | Pfister |

\* cited by examiner

CONTENT-ADAPTIVE IMAGE RESIZING METHOD AND RELATED APPARATUS THEREOF

CROSS REFERENCE TO RELATED APPLICATIONS

This application claims the benefit of U.S. provisional application No. 61/651,499, filed on May 24, 2012 and incorporated herein by reference.

BACKGROUND

The disclosed embodiments of the present invention relate to generating a resized image, and more particularly, to content-adaptive image resizing methods and related apparatuses thereof.

Camera modules have become popular elements used in a variety of applications. For example, a smartphone is typically equipped with a camera module, thus allowing a user to easily and conveniently take pictures by using the smartphone. However, due to inherent characteristics of the smartphone, the smartphone is prone to generate blurred images. For example, the camera aperture and/or sensor size of the smartphone is typically small, which leads to a small amount of light arriving at each pixel in camera sensor. As a result, the image quality may suffer from the small camera aperture and/or sensor size.

Besides, due to lightweight and portability of the smartphone, the smartphone tends to be affected by hand shake. Specifically, the shake of the smartphone will last for a period of time. Hence, any picture taken during this period of time would be affected by the hand shake. An image deblurring algorithm may be performed upon the blurred images. However, the computational complexity of the image deblurring algorithm is very high, resulting in considerable power consumption. Besides, artifact will be introduced if the image deblurring algorithm is not perfect.

Moreover, a camera module with an optical image stabilizer (OIS) is expensive. Hence, the conventional smartphone is generally equipped with a digital image stabilizer (i.e., an electronic image stabilizer (EIS)). The digital image stabilizer can counteract the motion of images, but fails to prevent image blurring. In addition to the camera shake, the movement of a target object within a scene to be captured may cause the captured image to have blurry image contents.

As mentioned above, the image capture result may be affected by hand shake and/or movement of the target object. It is possible that one partial region of the captured image is blurry, while another partial region of the captured image is clear. Hence, applying the same filter setting to the whole captured image may fail to obtain an output image with optimal quality.

As a result, when the camera module is affected by hand shake and/or there are moving objects within the scene to be captured, still images generated by the camera module under a photo mode or video frames of a video sequence generated by the camera module under a video recording mode would have blurry image contents.

SUMMARY

In accordance with exemplary embodiments of the present invention, content-adaptive image resizing methods and related apparatuses thereof are proposed to solve the above-mentioned problem.

According to a first aspect of the present invention, an exemplary image resizing method is disclosed. The exemplary image resizing method includes at least the following steps: receiving at least one input image; scaling the at least one input image to different image resolutions to generate a plurality of scaled images; obtaining a plurality of processed images derived from the scaled images, respectively, wherein an image resolution of each of the processed images is equal to a target image resolution, and the target image resolution is different from an image resolution of the at least one input image; performing an image content analysis upon at least one image selected from the processed images and the at least one input image to obtain an image content analysis result; and creating a target image with the target image resolution by combining pixels selected from the processed images according to the image content analysis result.

According to a second aspect of the present invention, an exemplary image resizing method is disclosed. The exemplary image resizing method includes at least the following steps: receiving at least one input image; performing an image content analysis upon at least one image selected from the at least one input image to obtain an image content analysis result; and creating a target image with a target image resolution by scaling the at least one input image according to the image content analysis result, wherein the target image resolution is different from an image resolution of the at least one input image.

According to a third aspect of the present invention, an exemplary image resizing apparatus is disclosed. The exemplary image resizing apparatus includes an input circuit, a resizing circuit, an image content analysis circuit and a combining circuit. The input circuit is arranged for receiving at least one input image. The resizing circuit is arranged for scaling the at least one input image to different image resolutions to generate a plurality of scaled images, and obtaining a plurality of processed images derived from the scaled images, respectively, wherein an image resolution of each of the processed images is equal to a target image resolution, and the target image resolution is different from an image resolution of the at least one input image. The image content analysis circuit is arranged for performing an image content analysis upon at least one image selected from the processed images and the at least one input image to obtain an image content analysis result. The combining circuit is arranged for creating a target image with the target image resolution by combining pixels selected from the processed images according to the image content analysis result.

According to a fourth aspect of the present invention, an exemplary image resizing apparatus is disclosed. The exemplary image resizing apparatus includes an input circuit, an image content analysis circuit, and a resizing circuit. The input circuit is arranged for receiving at least one input image. The image content analysis circuit is arranged for performing an image content analysis upon at least one image selected from the at least one input image to obtain an image content analysis result. The resizing circuit is arranged for creating a target image with a target image resolution by scaling the at least one input image according to the image content analysis result, wherein the target image resolution is different from an image resolution of the at least one input image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Due to development of the camera module, the camera resolution/capture resolution of the camera module may be higher than the required video recording resolution/still image resolution. For example, the camera sensor may be equipped with 8M pixels, and the still image/video frame only requires pixel data of 2M pixels. The present invention takes advantage of the discrepancy between the camera resolution/capture resolution of the camera module and the required video recording resolution/still image resolution to remove or mitigate the image blurring occurring in image region(s) of a still image or a video frame. One technical feature of the present invention is to resize an input image (e.g., a still image or a video frame) for image deblurring. Image regions with different blur/sharpness/motion levels require different resizing settings (e.g., different resizing ratios, different scaling kernel coefficient settings, or different super-resolution algorithms) to be clearer/sharper. Applying the same resizing ratio/scaling kernel coefficient setting to the input image would fail to remove all blurry regions. The present invention therefore proposes a content-adaptive scaling scheme which obtains a resized image with enhanced image quality by referring to an image content analysis result to apply different resizing settings to image regions with different blur/sharpness levels in the input image. Further details are described as below.

Figure 1:
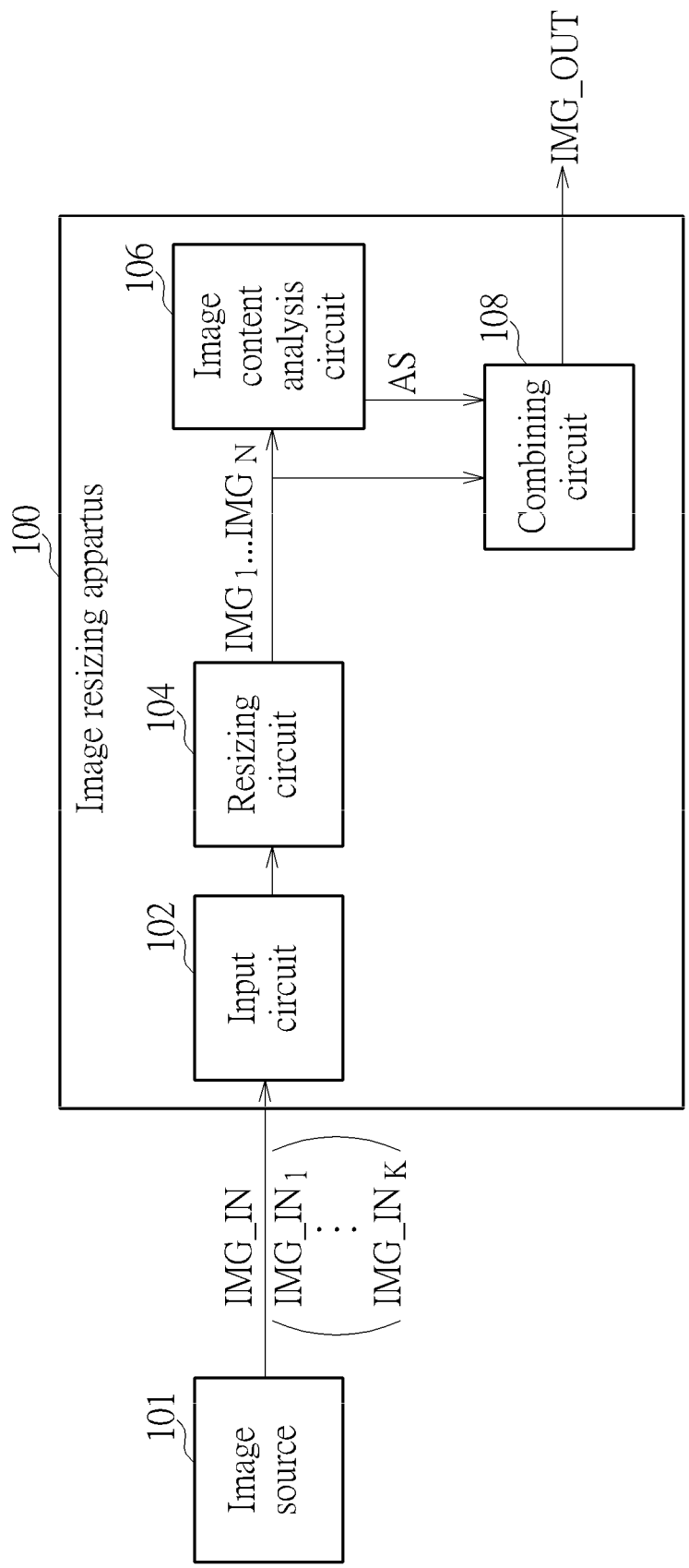
FIG. 1 is a block diagram illustrating an image resizing apparatus according to a first embodiment of the present invention.

FIG. 1 is a block diagram illustrating an image resizing apparatus according to a first embodiment of the present invention. The image resizing apparatus 100 may be used for image deblurring. As shown in FIG. 1, the image resizing apparatus 100 includes an input circuit 102, a resizing circuit 104, an image content analysis circuit 106, and a combining circuit 108. The input circuit 102 acts as an input interface coupled to an image source 101, and arranged for receiving at least one input image (e.g., a single input image IMG_IN, or multiple input images $IMG\_IN_1$-$IMG\_IN_K$). In a case where the input image IMG_IN is received by the input circuit 102, the image resizing apparatus 100 is operative to generate a target image IMG_OUT with a target image resolution in response to the received input image IMG_IN. In another case where multiple input images $IMG\_IN_1$-$IMG\_IN_K$ are received by the input circuit 102, the image resizing apparatus 100 is operative to generate the target image IMG_OUT with the target image resolution in response to the received input images $IMG\_IN_1$-$IMG\_IN_K$. The target image IMG_OUT may be a still image or a video frame of a video sequence. Besides, the target image resolution (i.e., a final image size) is different from an image resolution (i.e., an initial image size) of the input image(s) IMG_IN/$IMG\_IN_1$-$IMG\_IN_K$. For example, the target image resolution is lower than the image resolution of the input image(s) for image deblurring. However, this is for illustrative purposes only, and is not meant to be a limitation of the present invention. Any image processing apparatus using the proposed content-adaptive image resizing technique for image upscaling/downscaling falls within the scope of the present invention.

By way of example, the image source 101 may be a camera module with a camera resolution higher than a required video recording resolution/still image resolution. In other words, the image resolution of the input image(s) IMG_IN/$IMG\_IN_1$-$IMG\_IN_K$ is higher than the target image resolution of the target image IMG_OUT, where the target image resolution may be a high-definition (HD) resolution such as 1920× 1080, and the target image IMG_OUT may be a video frame of the required video sequence or a required still image. Alternatively, the image source 101 may be Internet or a storage device which provides the input image to the image resizing apparatus 100 for image deblurring.

Figure 2:
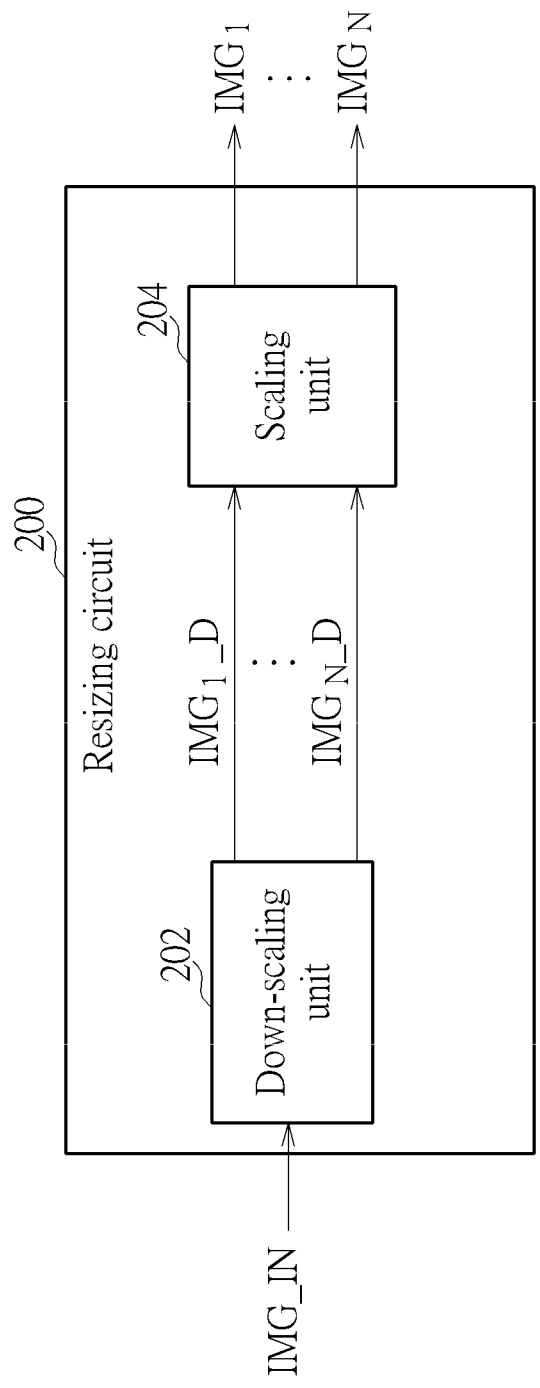
FIG. 2 is a block diagram illustrating a first exemplary implementation of the resizing circuit shown in FIG. 1.

The resizing circuit 104 is coupled to the input circuit 102, and arranged for scaling the input image(s) IMG_IN/$IMG\_IN_1$-$IMG\_IN_K$ to different image resolutions to thereby generate a plurality of scaled images, and obtaining a plurality of processed images $IMG_1$-$IMG_N$ derived from the scaled images, respectively, wherein an image resolution of each of the processed images is equal to the target image resolution. Please refer to FIG. 2, which is a block diagram illustrating a first exemplary implementation of the resizing circuit 104 shown in FIG. 1. As shown in FIG. 2, the resizing circuit 200 includes a down-scaling unit 202 and a scaling unit 204. The down-scaling unit 202 downscales the input image IMG_IN to different image resolutions to generate a plurality of downscaled images $IMG_1\_D$-$IMG_N\_D$ acting as the scaled images mentioned above. The input image IMG_IN may include image regions with different blur/sharpness levels. Thus, a first image region with a first blur/sharpness level in the input image IMG_IN would be clearer/sharper in a first scaled image due to a first downscaling ratio, and a second image region with a second blur/sharpness level in the input image IMG_IN would be clearer/sharper in a second scaled image due to a second downscaling ratio. In other words, though the downscaled images $IMG_1\_D$-$IMG_N\_D$ are derived from the same input image IMG_IN, the downscaled images $IMG_1\_D$-$IMG_N\_D$ may have different clear regions due to different downscaling ratios. The scaling unit 204 receives the downscaled images $IMG_1\_D$-$IMG_N\_D$, and selectively bypasses, upscales or downscales each of the downscaled images $IMG_1\_D$-$IMG_N\_D$ to make the processed images $IMG_1$-$IMG_N$ generated from the resizing circuit 104 have the same target image resolution. More specifically, when an image resolution of a scaled image (i.e., a down-scaled image) is smaller than the target image resolution, the scaling unit 204 generates a processed image by upscaling the scaled image to the target image resolution. When the image resolution of the scaled image is larger than the target image resolution, the scaling unit 204 generates the processed image by downscaling the scaled image to the target image resolution. When the image resolution of the scaled image is equal to the target image resolution, the scaling unit 204 directly outputs the scaled image as the processed image. In this way, the processed images $IMG_1$-$IMG_N$ with the target image resolution are derived from the downscaled images $IMG_1\_D$-$IMG_N\_D$, respectively.

Figure 3:
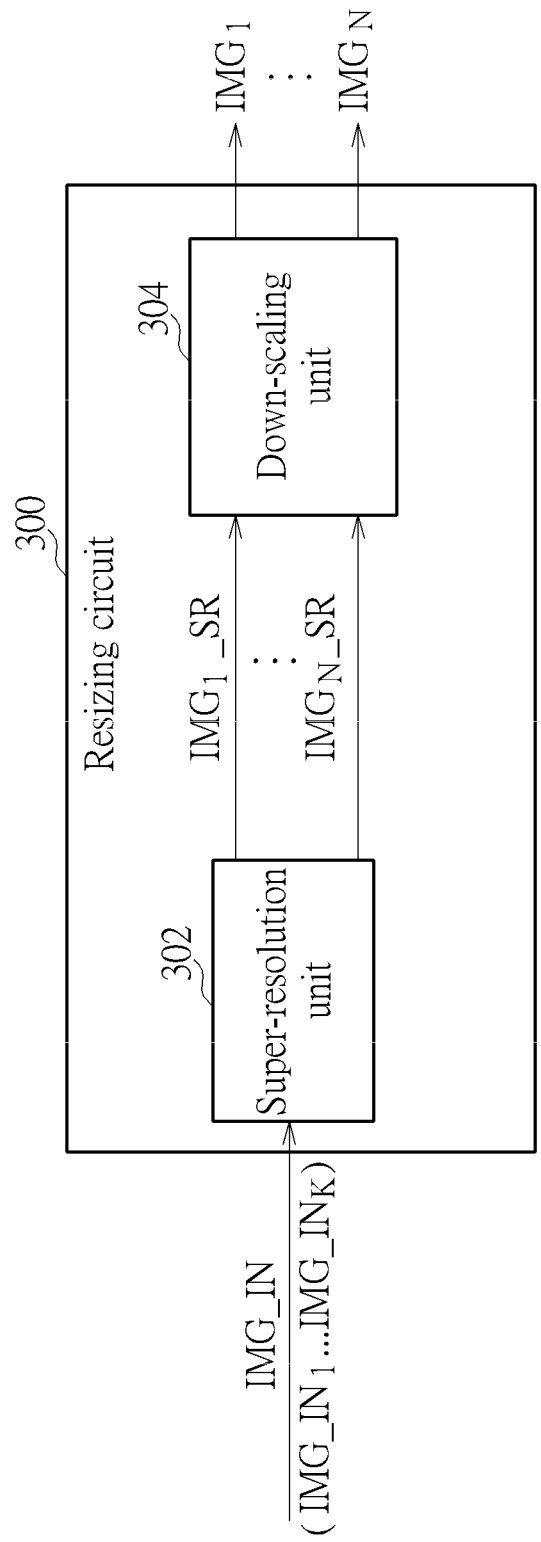
FIG. 3 is a block diagram illustrating a second exemplary implementation of the resizing circuit shown in FIG. 1.

Please refer to FIG. 3, which is a block diagram illustrating a second exemplary implementation of the resizing circuit 104 shown in FIG. 1. As shown in FIG. 3, the resizing circuit 300 includes a super-resolution (SR) unit 302 and a down-scaling unit 304. The SR unit 302 is capable of generating one higher-resolution image based on one lower-resolution image (e.g., IMG_IN) or multiples lower-resolution image (e.g., $IMG\_IN_1$-$IMG\_IN_K$), depending upon the SR algorithm employed. Hence, the SR unit 302 upscales the input image(s) IMG_IN/$IMG\_IN_1$-$IMG\_IN_K$ to one of a plurality of difference resolutions and then creates an upscaled image (i.e., an SR image) according to the employed SR algorithm. In this exemplary implementation, the SR unit 302 creates a plurality of SR images $IMG_1\_SR$-$IMG_N\_SR$ from the same input image(s) IMG_IN/$IMG\_IN_1$-$IMG\_IN_K$ to act as the scaled images mentioned above, where the SR images $IMG_1\_SR$-$IMG_N\_SR$ have different image resolutions. The down-scaling unit 304 receives the SR images $IMG_1\_SR$-$IMG_N\_SR$, and downscales each of the SR images $IMG_1\_SR$-$IMG_N\_SR$ to make the processed images $IMG_1$-$IMG_N$ generated from the resizing circuit 104 have the same target image resolution. In this way, the processed images $IMG_1$-$IMG_N$ with the target image resolution are derived from the SR images $IMG_1\_SR$-$IMG_N\_SR$, respectively. Compared to the input image(s) IMG_IN/$IMG\_IN_1$-$IMG\_IN_K$, the SR images $IMG_1\_SR$-$IMG_N\_SR$ may have better image quality due to the SR algorithm. Further, as the SR images $IMG_1\_SR$-$IMG_N\_SR$ have different image resolutions, the down-scaling unit 304 has to generate the processed images $IMG_1$-$IMG_N$ by using different downscaling ratios. Hence, a first image region with a first blur/sharpness level in a first SR image would be clearer/sharper in a first processed image due to a first downscaling ratio, and a second image region with a second blur/sharpness level in a second SR image would be clearer/sharper in a second processed image due to a second downscaling ratio. In other words, the downscaled images (i.e., the processed images $IMG_1$-$IMG_N$) may have different clear regions due to different downscaling ratios.

Figure 4:
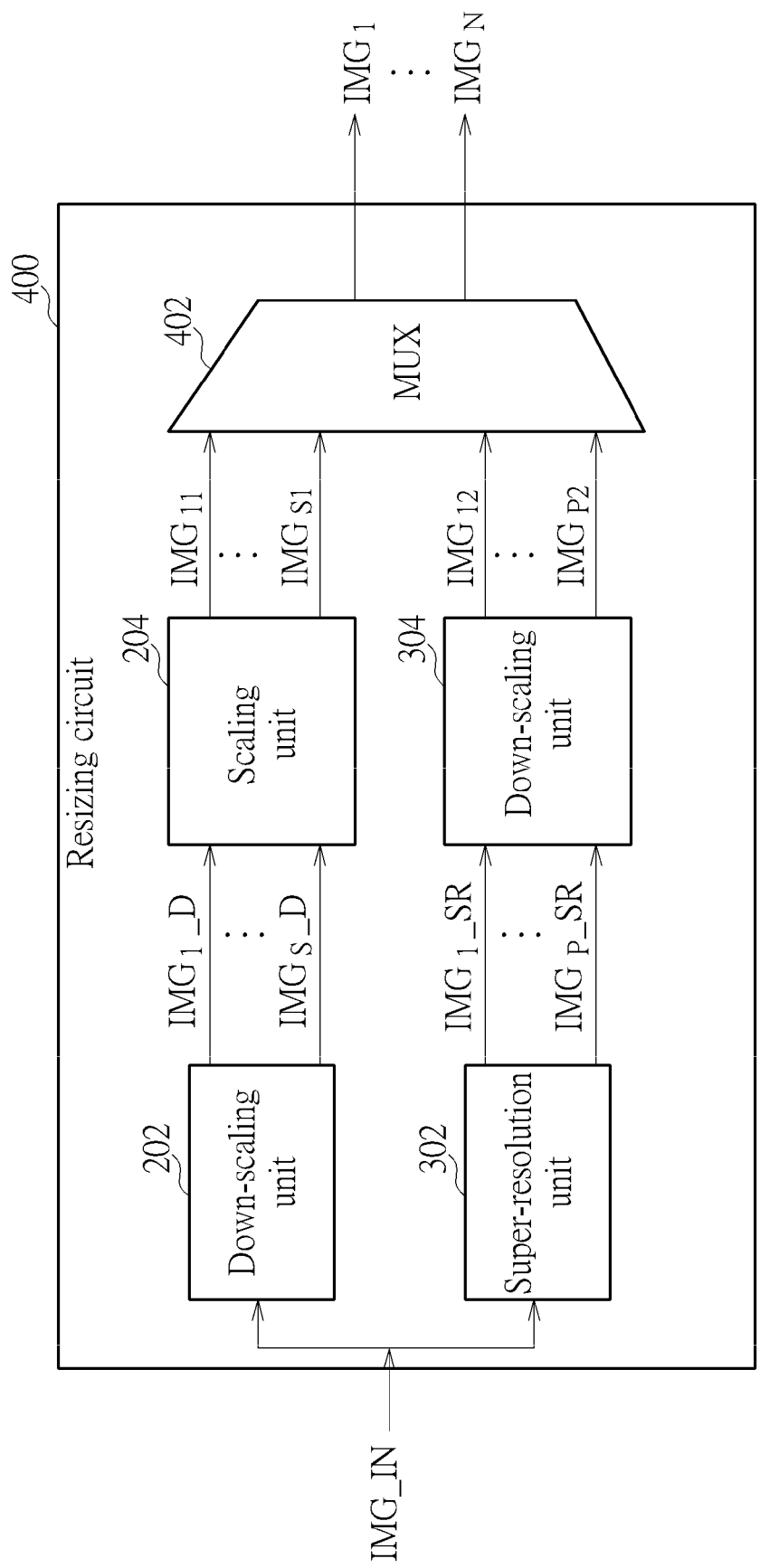
FIG. 4 is a block diagram illustrating a third exemplary implementation of the resizing circuit shown in FIG. 1.

Please refer to FIG. 4, which is a block diagram illustrating a third exemplary implementation of the resizing circuit 104 shown in FIG. 1. As shown in FIG. 4, the resizing circuit 400 includes a multiplexer (MUX) 402 and the aforementioned down-scaling unit 202, scaling unit 204, SR unit 302 and down-scaling unit 304. In this embodiment, the down-scaling unit 202 downscales the input image IMG_IN to different image resolutions to generate a plurality of downscaled images $IMG_1\_D$-$IMG_S\_D$, and the scaling unit 204 generates a plurality of first candidate images $IMG_{11}$-$IMG_{S1}$. Besides, the SR unit 302 creates a plurality of SR images $IMG_1\_SR$-$IMG_P\_SR$ from the input image IMG_IN, and the down-scaling unit 304 generates a plurality of second candidate images $IMG_{12}$-$IMG_{P2}$. As a person skilled in the art can readily understand details of above-mentioned operations after reading above paragraphs directed to the examples shown in FIG. 2 and FIG. 3, further description is omitted here for brevity. The MUX 402 is coupled to the scaling unit 204 and down-scaling unit 304, and arranged to select N images from the first candidate images $IMG_{11}$-$IMG_{S1}$ and the second candidate images $IMG_{12}$-$IMG_{P2}$ to serve as the processed images $IMG_1$-$IMG_N$. That is, at least one of the processed images $IMG_1$-$IMG_N$ is derived from an output of the scaling unit 204, and at least one of the processed images $IMG_1$-$IMG_N$ is derived from an output of the down-scaling unit 304.

After the processed images $IMG_1$-$IMG_N$ are generated from the resizing circuit 104, the image content analysis circuit 106 performs an image content analysis upon at least one image selected from the processed images $IMG_1$-$IMG_N$ and the input image(s) IMG_IN/$IMG\_IN_1$-$IMG\_IN_K$ to obtain an image content analysis result AS. Specifically, the image content analysis result AS includes local properties corresponding to a plurality of pixels located at a plurality of pixel positions in the target image IMG_OUT to be generated from the image resizing apparatus 100. In one exemplary design, the image content analysis result AS is derived from analyzing original image contents included in one or more images selected from the input image(s) IMG_IN/$IMG\_IN_1$-$IMG\_IN_K$. In another exemplary design, the image content analysis result AS is derived from analyzing adjusted image contents included in one or more images selected from the processed images $IMG_1$-$IMG_N$. In yet another exemplary design, the image content analysis result AS is derived from analyzing original image contents included in one or more images selected from the input image(s) IMG_IN/$IMG\_IN_1$-$IMG\_IN_K$ and adjusted image contents included in one or more images selected from the processed images $IMG_1$-$IMG_N$.

By way of example, but not limitation, the image content analysis may include a sharpness analysis, a blur analysis, a face detection, a motion estimation, and/or an image quality metric calculation. When the image content analysis performs the sharpness analysis, the local properties include calculated sharpness levels of selected pixels. When the image content analysis performs the blur analysis, the local properties include calculated blur levels of selected pixels. When the image content analysis performs the face detection, the local properties are related to appearance of a face region having one or more face images. When the image content analysis performs the motion estimation, the local properties are related to motion statuses of selected pixels. For example, the motion status is indicative of a motion magnitude and a motion direction. When the image content analysis performs the image quality metric calculation, the local properties are related to at least one of color, texture, brightness, contrast, distortion, edge, and structure.

The combining circuit 108 is coupled to the resizing circuit 104 and the image content analysis circuit 106, and arranged for creating the target image IMG_OUT with the target image resolution by combining pixels selected from the processed images $IMG_1$-$IMG_N$ according to the image content analysis result AS. The local properties corresponding to pixels located at a plurality of pixel positions in the target image IMG_OUT indicate which pixels have better quality. Hence, by combining pixels with better quality, the target image IMG_OUT with better quality is generated by the combining circuit 108.

Figure 5:
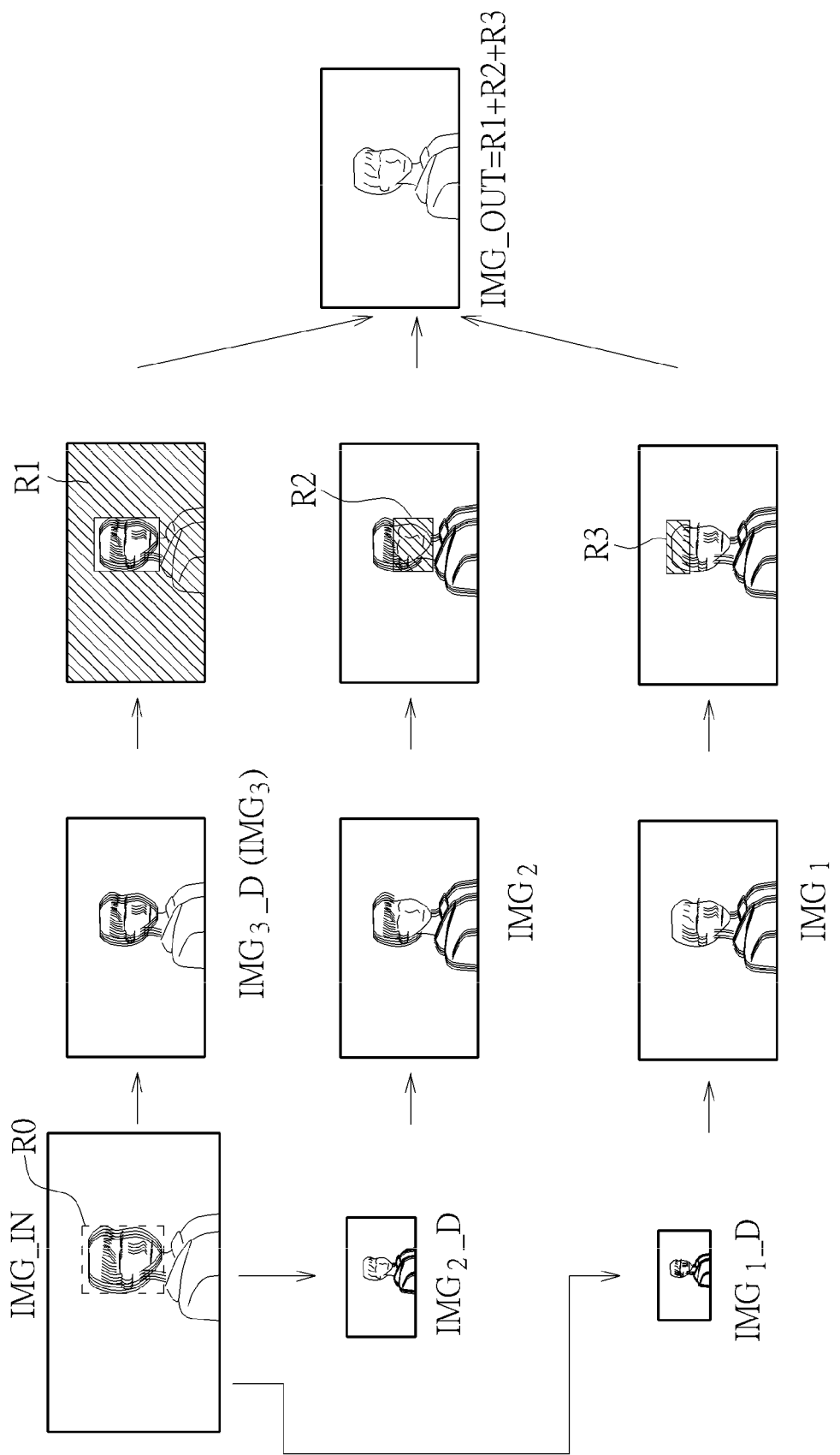
FIG. 5 is a diagram illustrating an image resizing example based on the proposed video resizing apparatus shown in FIG. 1.

Please refer to FIG. 5, which is a diagram illustrating an image resizing example based on the proposed video resizing apparatus 100. Assume that the resizing circuit 104 shown in FIG. 1 is implemented using the resizing circuit 200 shown in FIG. 2. In this example, the down-scaling unit 202 down-scales the input image IMG_IN to different image resolutions, and accordingly generates down-scaled images $IMG_1\_D$, $IMG_2D$, $IMG_3\_D$. As the image resolution of the down-scaled image $IMG_3\_D$ is equal to the target image resolution, the scaling unit 204 directly outputs the down-scaled image $IMG_1\_D$ as the processed image $IMG_3$. As the image resolution of the down-scaled images $IMG_1\_D$ and $IMG_2\_D$ is lower than the target image resolution, the scaling unit 204 upscales the down-scaled images $IMG_1\_D$ and $IMG_2\_D$ to the target image resolution to thereby generate the processed images $IMG_1$ and $IMG_2$. As shown in FIG. 5, the input image IMG_IN has a blurry image region R0. In this example, different downscaling ratios are employed by the down-scaling unit 202. Hence, the processed image $IMG_3$ has a clear image region R1, which is indicated by the image content analysis result AS; the processed image $IMG_2$ has a clear image region R2, which is indicated by the image content analysis result AS; and the processed image $IMG_1$ has a clear image region R3, which is indicated by the image content analysis result AS. The combining circuit 108 refers to the image content analysis result AS to combine the image region R1 selected from the processed image $IMG_3$, the image region R2 selected from the processed image $IMG_2$, and the image region R3 selected from the processed image $IMG_1$. Compared to the higher-resolution input image IMG_IN, the lower-resolution target image IMG_OUT generated by the proposed image resizing apparatus 100 has better image quality.

In one exemplary design, each pixel in the target image IMG_OUT may be obtained by selecting one co-located pixel from the processed images $IMG_1$-$IMG_N$. In an alternative design, a pixel in the target image IMG_OUT may be obtained by selecting one co-located pixel from the processed images $IMG_1$-$IMG_N$ or obtained by blending more than one co-located pixel selected from the processed images $IMG_1$-$IMG_N$. For example, when a pixel in the target image IMG_OUT is not located at boundaries of the image regions R1-R3, a co-located pixel with best quality is selected from the processed images $IMG_1$-$IMG_N$ to set the pixel in the target image IMG_OUT. However, when a pixel in the target image IMG_OUT is located at boundaries of the image regions R1-R3, multiple co-located pixels in the processed images $IMG_1$-$IMG_N$ may be selected and then alpha-blended to set the pixel in the target image IMG_OUT. In this way, a seamless combination of the image regions R1-R3 can be achieved due to a smooth transition between boundaries of the image regions R1-R3 in the target image IMG_OUT.

Figure 6:
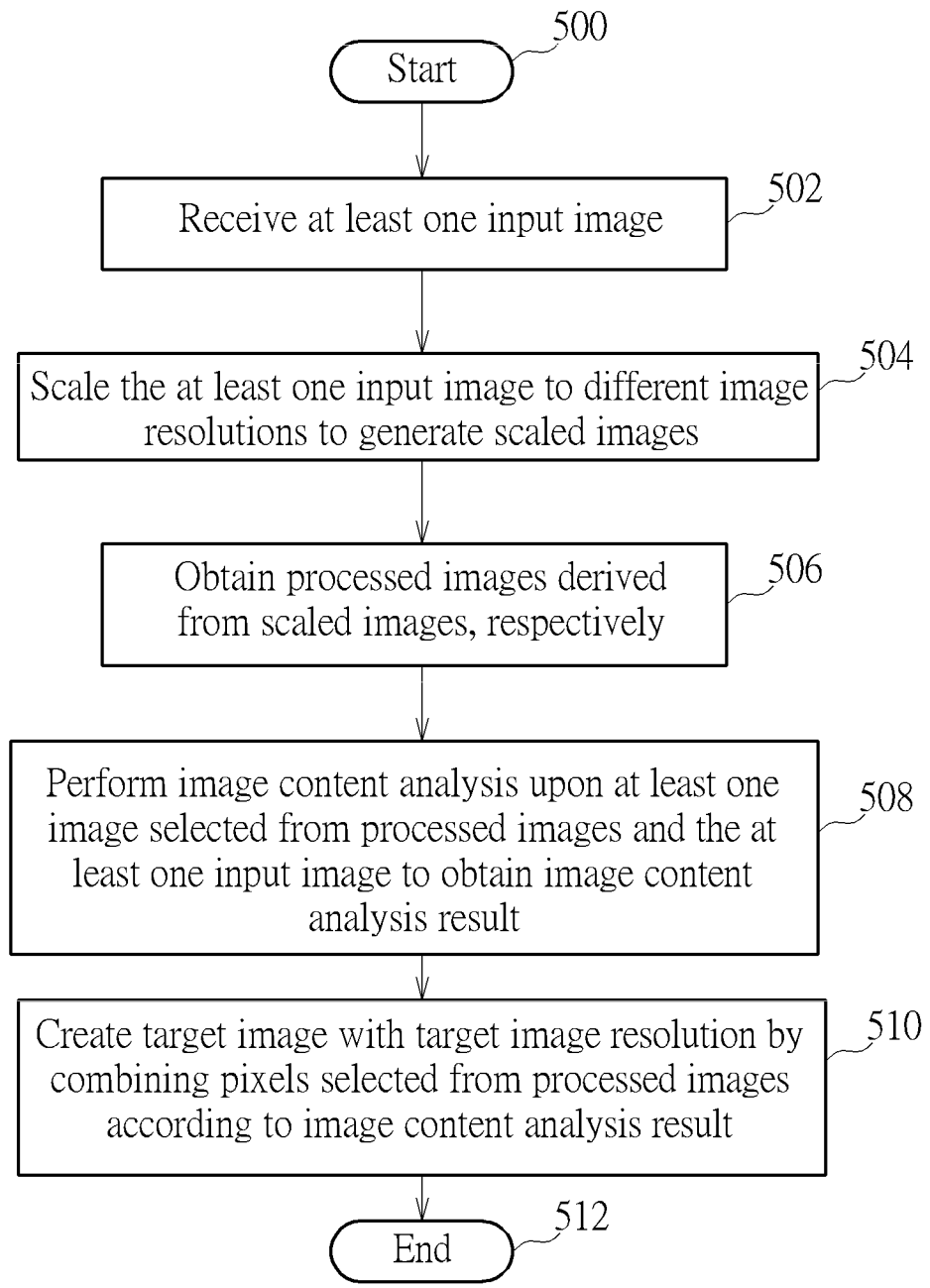
FIG. 6 is a flowchart illustrating an image resizing method according to a first embodiment of the present invention.

FIG. 6 is a flowchart illustrating an image resizing method according to a first embodiment of the present invention. The image resizing method may be employed by the image resizing apparatus 100 shown in FIG. 1. Provided that the result is substantially the same, the steps are not required to be executed in the exact order shown in FIG. 6. The image resizing method may be briefly summarized as below.

Step 500: Start.

Step 502: Receive at least one input image.

Step 504: Scale the at least one input image to different image resolutions to generate a plurality of scaled images.

Step 506: Obtain a plurality of processed images derived from the scaled images, respectively, wherein an image resolution of each of the processed images is equal to a target image resolution, and the target image resolution is different from an image resolution of the at least one input image.

Step 508: Perform an image content analysis upon at least one image selected from the processed images and the at least one input image to obtain an image content analysis result.

Step 510: Create a target image with the target image resolution by combining pixels selected from the processed images according to the image content analysis result.

Step 512: End.

As a person skilled in the art can readily understand details of each step shown in FIG. 6 after reading above paragraphs directed to the image resizing apparatus 100, further description is omitted here for brevity.

Figure 7:
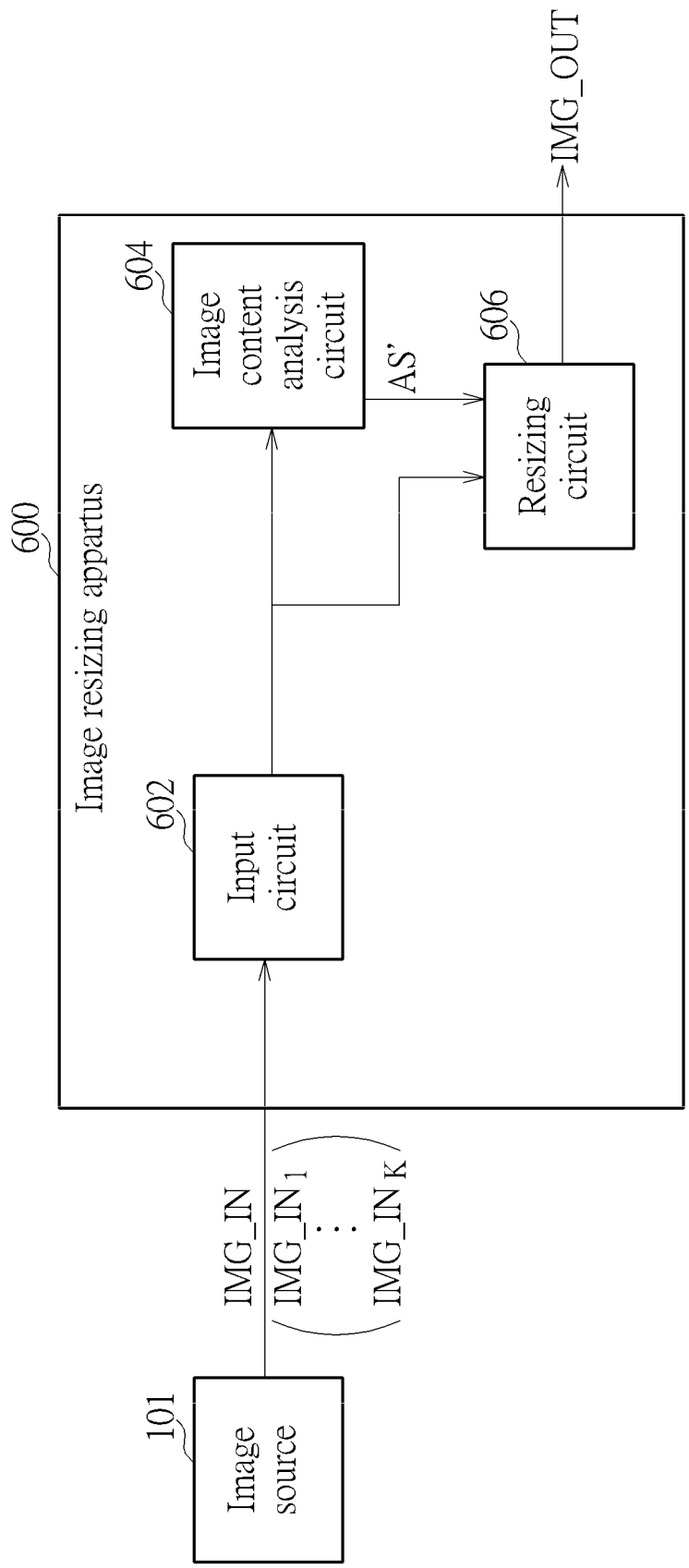
FIG. 7 is a block diagram illustrating an image resizing apparatus according to a second embodiment of the present invention.

FIG. 7 is a block diagram illustrating an image resizing apparatus according to a second embodiment of the present invention. The image resizing apparatus 600 may be used for image deblurring. As shown in FIG. 7, the image resizing apparatus 600 includes an input circuit 602, an image content analysis circuit 604, and a resizing circuit 606. The input circuit 602 acts as an input interface coupled to the image source 101, and arranged for receiving at least one input image (e.g., a single input image IMG_IN, or multiple input images $IMG\_IN_1$-$IMG\_IN_K$). In a case where the input image IMG_IN is received by the input circuit 602, the image resizing apparatus 600 is operative to generate a target image IMG_OUT with a target image resolution in response to the received input image IMG_IN. In another case where multiple input images $IMG\_IN_1$-$IMG\_IN_K$ are received by the input circuit 602, the image resizing apparatus 600 is operative to generate the target image IMG_OUT with the target image resolution in response to the received input images $IMG\_IN_1$-$IMG\_IN_K$. The target image IMG_OUT may be a still image or a video frame of a video sequence. Besides, the target image resolution (i.e., a final image size) is different from an image resolution (i.e., an initial image size) of the input image(s) $IMG\_IN/IMG\_IN_1$-$IMG\_IN_K$. For example, the target image resolution is smaller than the image resolution of the input image(s) for image deblurring. However, this is for illustrative purposes only, and is not meant to be a limitation of the present invention. Any image processing apparatus using the proposed content-adaptive image resizing technique for image upscaling/downscaling falls within the scope of the present invention.

The image content analysis circuit 604 is coupled to the input circuit 602, and arranged for performing an image content analysis upon at least one image selected from the input image(s) $IMG\_IN/IMG\_IN_1$-$IMG\_IN_K$ to obtain an image content analysis result AS'. Specifically, the image content analysis result AS' includes local properties corresponding to a plurality of pixels located at a plurality of pixel positions in the input image(s) $IMG\_IN/IMG\_IN_1$-$IMG\_IN_K$ received by the input circuit 602. In one exemplary design, the image content analysis result AS' is derived from analyzing original image contents included in the single input image IMG_IN received by the input circuit 602. In another exemplary design, the image content analysis result AS' is derived from analyzing original image contents included in one or more images selected from multiple input images $IMG\_IN_1$-$IMG\_IN_K$ received by the input circuit 602.

By way of example, but not limitation, the image content analysis may include a sharpness analysis, a blur analysis, a face detection, a motion estimation, and/or an image quality metric calculation. When the image content analysis performs the sharpness analysis, the local properties include calculated sharpness levels of selected pixels. When the image content analysis performs the blur analysis, the local properties include calculated blur levels of selected pixels. When the image content analysis performs the face detection, the local properties are related to appearance of a face region. When the image content analysis performs the motion estimation, the local properties are related to motion statuses of selected pixels. For example, the motion status is indicative of a motion magnitude and a motion direction. When the image content analysis performs the image quality metric calculation, the local properties are related to at least one of color, texture, brightness, contrast, distortion, edge, and structure.

Figure 8:
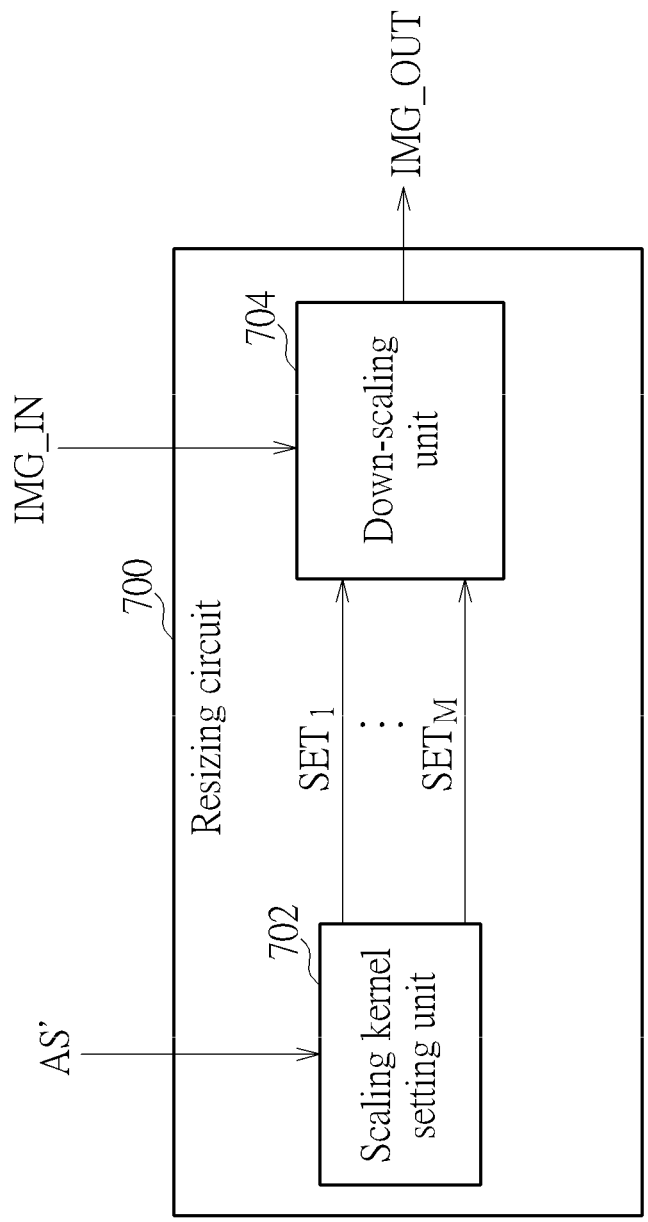
FIG. 8 is a block diagram illustrating a first exemplary implementation of the resizing circuit shown in FIG. 7.

The resizing circuit 606 is coupled to the input circuit 602 and the image content analysis circuit 604, and arranged for creating the target image IMG_OUT with the target image resolution by scaling the input image(s) IMG_IN/IMG_IN$_1$-IMG_IN$_K$ according to the image content analysis result AS'. Please refer to FIG. 8, which is a block diagram illustrating a first exemplary implementation of the resizing circuit 606 shown in FIG. 7. As shown in FIG. 8, the resizing circuit 700 includes a scaling kernel setting unit 702 and a down-scaling unit 704. The scaling kernel setting unit 702 refers to the image content analysis result AS' to determine a corresponding scaling kernel coefficient setting SET$_1$-SET$_M$ for each of a plurality of selected pixels in the input image IMG_IN, where each of the scaling kernel coefficient settings SET$_1$-SET$_M$ is to configure scaling kernel coefficients of a scaling kernel (e.g., coefficients of a filter used for down-scaling). For example, when the local property of a selected pixel indicates that the selected pixel has lower image quality (e.g., a lower sharpness level, a higher blur level, or a larger motion magnitude), the scaling kernel setting unit 702 may configure the corresponding scaling kernel coefficient setting to make the scaling kernel to be applied to the selected pixel have a stronger sharpness enhancement and/or a larger kernel size (i.e., a larger filter tap number). In addition, the kernel direction (i.e., the filtering direction) may be set according to the motion direction.

After the scaling kernel coefficient settings SET$_1$-SET$_M$ are determined by the scaling kernel setting unit 702 in response to the image content analysis result AS', the down-scaling unit 704 creates the target image IMG_OUT by processing each of the selected pixels in the input image IMG_IN according to the corresponding scaling kernel coefficient setting. As each of the selected pixels has its own scaling kernel coefficient setting, image regions with different blur/sharpness/motion levels are not processed using the same scaling kernel. In this way, image regions with different blur/sharpness/motion levels can be properly downscaled to be clearer/sharper. To put is another way, the resizing circuit 700 is equivalent to a combinational filter composed of a first filter which downscales the input image IMG_IN to different image resolutions and a second filter which scales the downscaled images to the same target resolution.

Figure 9:
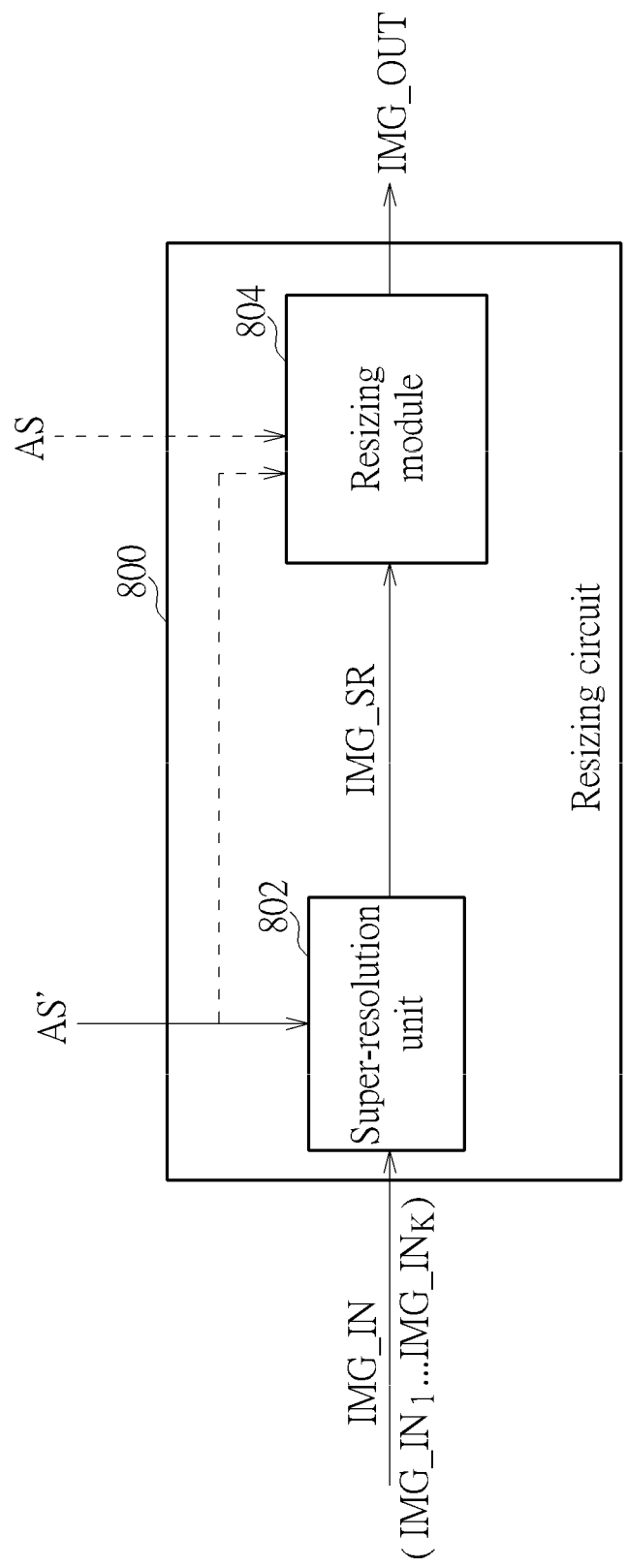
FIG. 9 is a block diagram illustrating a second exemplary implementation of the resizing circuit shown in FIG. 7.

Please refer to FIG. 9, which is a block diagram illustrating a second exemplary implementation of the resizing circuit 606 shown in FIG. 7. As shown in FIG. 9, the resizing circuit 800 includes a super-resolution (SR) unit 802 and a resizing module 804. The SR unit 802 is capable of generating one higher-resolution image based on one lower-resolution image (e.g., IMG_IN) or multiples lower-resolution images (e.g., IMG_IN$_1$-IMG_IN$_K$), depending upon the SR algorithm employed. In this example, the SR unit 802 is arranged to create an SR image IMG_SR from the input image(s) IMG_IN/IMG_IN$_1$-IMG_IN$_K$ according to the image content analysis result AS'. Specifically, the present invention proposes using a content-adaptive super-resolution algorithm to generate the SR image IMG_SR. For example, the SR unit 802 uses a larger kernel size upon a more blurry content. For another example, the SR unit 802 applies sub-pixel super-resolution processing to blurry image regions, and does not apply sub-pixel super-resolution processing to clear image regions. In other words, all pixels of the SR image IMG_SR are not determined by the SR unit 802 using a fixed super-resolution algorithm. In this way, a higher-resolution image with enhanced image quality is generated by the SR unit 802 using the proposed content-adaptive SR algorithm.

The resizing module 804 receives the SR image IMG_SR, and creates the target image IMG_OUT by downscaling the SR image IMG_SR to the target resolution. In one exemplary design, the resizing module 804 may employ a conventional downscaling scheme which uses the same scaling kernel to process each selected pixel for downscaling the SR image IMG_SR to the target resolution. In another exemplary design, the resizing module 804 may employ the aforementioned content-adaptive downscaling scheme used in the image resizing apparatus 100, where the SR image IMG_SR in FIG. 9 acts as the input image in FIG. 1.

In a first exemplary implementation of the resizing module 804 based on the aforementioned content-adaptive scaling scheme, the resizing module 804 may be configured to have the aforementioned resizing circuit 104 and combining circuit 108. The resizing circuit 104 of the resizing module 804 receives the SR image IMG_SR as its input, and generates the processed images IMG$_1$-IMG$_N$ according to the SR image IMG_SR. The combining circuit 108 of the resizing module 804 obtains the image content analysis result AS' from the image content analysis circuit 604, and generates the target image IMG_OUT by combining pixels selected from the processed images IMG$_1$-IMG$_N$ according to the image content analysis result AS'.

In a second exemplary implementation of the resizing module 804 based on the aforementioned content-adaptive scaling scheme, the resizing module 804 may be configured to have the aforementioned resizing circuit 104, image content analysis circuit 106, and combining circuit 108. The resizing circuit 104 of the resizing module 804 receives the SR image IMG_SR as its input, and generates the processed images IMG$_1$-IMG$_N$ according to the SR image IMG_SR. The image content analysis circuit 106 of the resizing module 804 performs an image content analysis upon at least one image selected from the processed images and the SR image IMG_SR to obtain the image content analysis result AS. The combining circuit 108 of the resizing module 804 generates the target image IMG_OUT by combining pixels selected from the processed images IMG$_1$-IMG$_N$ according to the image content analysis result AS.

As a person skilled in the art can readily understand details of the content-adaptive scaling scheme employed by the resizing module 804 after reading above paragraphs directed to the image resizing apparatus 100 shown in FIG. 1, further description is omitted here for brevity.

Figure 10:
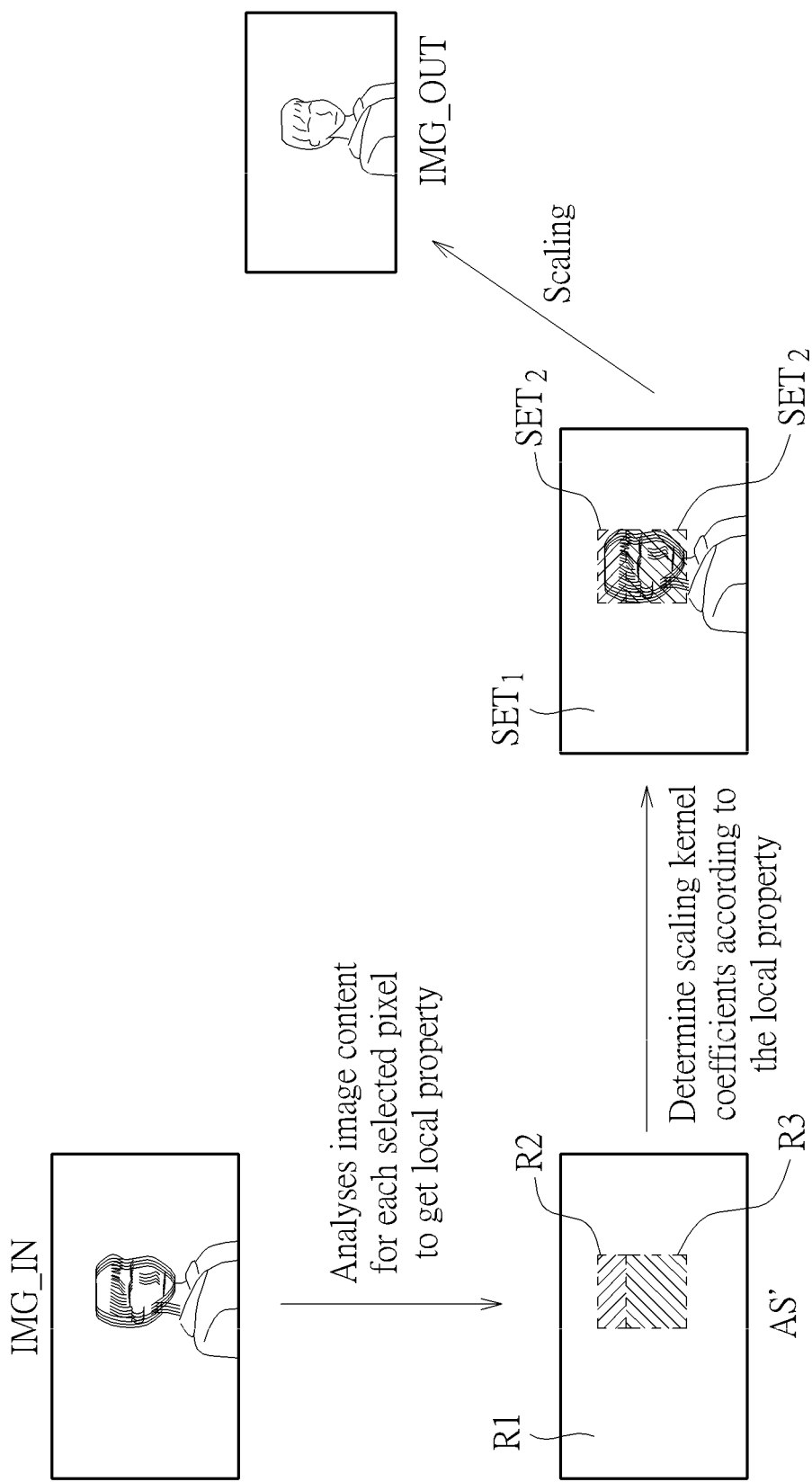
FIG. 10 is a diagram illustrating an image resizing example based on the proposed video resizing apparatus shown in FIG. 7.

Please refer to FIG. 10, which is a diagram illustrating an image resizing example based on the proposed video resizing apparatus 600. Assume that the resizing circuit 604 shown in FIG. 7 is implemented using the resizing circuit 700 shown in FIG. 8. In this example, the image content analysis circuit 604 analyzes the input image IMG_IN to obtain a local property of each selected pixel, where the selected pixels in the image region R1 have the same first local property, the selected pixels in the image region R2 have the same second local property, and the selected pixels in the image region R3 have the same third local property. Hence, the scaling kernel setting unit 702 determines the first scaling kernel coefficient setting $SET_1$ for each selected pixel in the image region R1, determines the second scaling kernel coefficient setting $SET_2$ for each selected pixel in the image region R2, and determines the third scaling kernel coefficient setting $SET_3$ for each selected pixel in the image region R3. Based on these different scaling kernel coefficient settings $SET_1$, $SET_2$ and $SET_3$, the down-scaling unit 704 generates the target image IMG_OUT with the target image resolution lower than an image resolution of the input image IMG_IN. Besides, compared to the input image IMG_IN, the target image IMG_OUT has better image quality due to the proposed content-adaptive scaling scheme.

Figure 11:
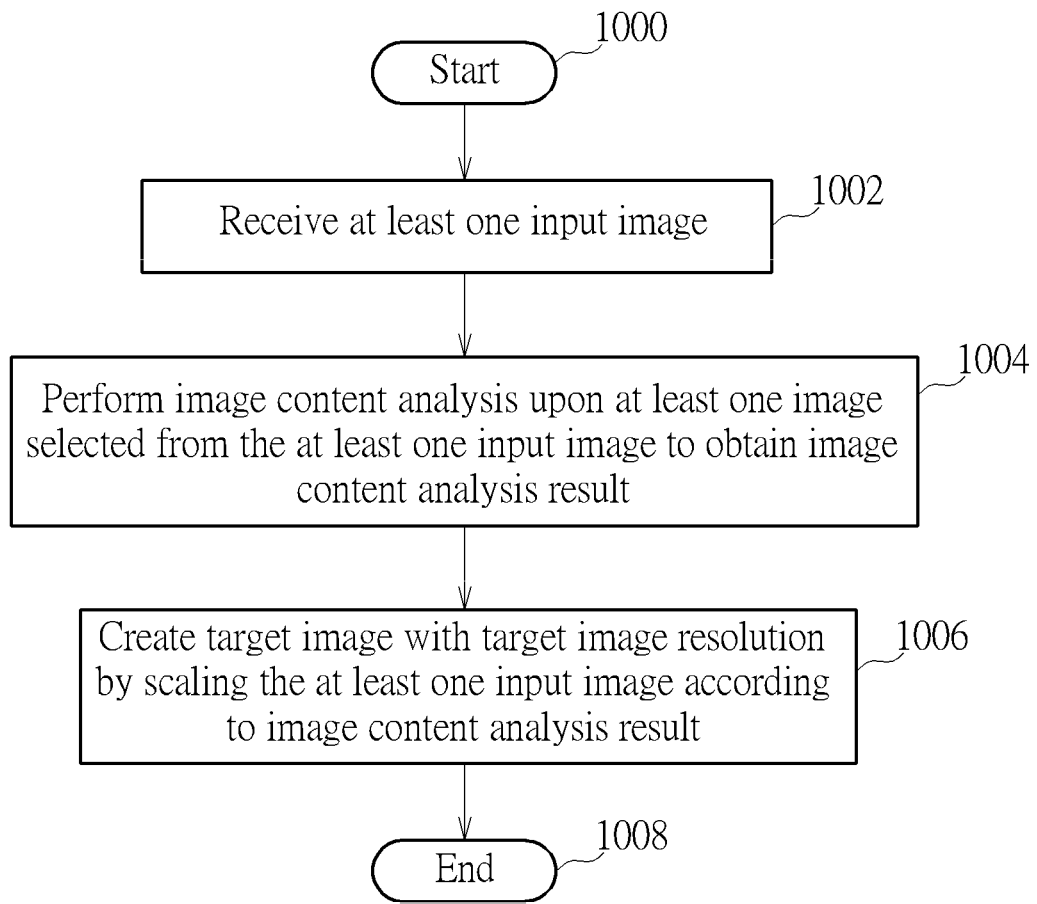
FIG. 11 is a flowchart illustrating an image resizing method according to a second embodiment of the present invention.

FIG. 11 is a flowchart illustrating an image resizing method according to a second embodiment of the present invention. The image resizing method may be employed by the image resizing apparatus 600 shown in FIG. 7. Provided that the result is substantially the same, the steps are not required to be executed in the exact order shown in FIG. 11. The image resizing method may be briefly summarized as below.

Step 1000: Start.

Step 1002: Receive at least one input image.

Step 1004: Perform an image content analysis upon at least one image selected from the at least one input image to obtain an image content analysis result.

Step 1006: Create a target image with a target image resolution by scaling the at least one input image according to the image content analysis result, wherein the target image resolution is different from an image resolution of the at least one input image.

Step 1008: End.

As a person skilled in the art can readily understand details of each step after reading above paragraphs directed to the image resizing apparatus 600, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image resizing method, comprising:
receiving at least one input image;
scaling the at least one input image to different image resolutions to generate a plurality of scaled images;
obtaining a plurality of processed images derived from the scaled images, respectively, wherein an image resolution of each of the processed images is equal to a target image resolution, and the target image resolution is different from an image resolution of the at least one input image;
performing an image content analysis upon at least one image selected from the processed images and the at least one input image to obtain an image content analysis result; and
creating a target image with the target image resolution by combining pixels selected from the processed images according to the image content analysis result.

2. The image resizing method of claim 1, wherein the step of scaling the at least one input image comprises:
downscaling the at least one input image to the different image resolutions to generate a plurality of downscaled images acting as the scaled images.

3. The image resizing method of claim 1, wherein the step of obtaining the processed images comprises:
when an image resolution of a scaled image is smaller than the target image resolution, generating a processed image by upscaling the scaled image to the target image resolution; or
when the image resolution of the scaled image is larger than the target image resolution, generating the processed image by downscaling the scaled image to the target image resolution; or
when the image resolution of the scaled image is equal to the target image resolution, directly utilizing the scaled image as the processed image.

4. The image resizing method of claim 1, wherein the image content analysis result includes local properties corresponding to a plurality of pixels located at a plurality of pixel positions in the target image.

5. The image resizing method of claim 4, wherein at least one of the local properties includes a sharpness level or a blur level.

6. The image resizing method of claim 4, wherein the step of creating the target image with the target image resolution comprises:
regarding each of the pixel positions, referring to local properties corresponding to specific pixels located at the pixel position in the processed images to select one of the specific pixels as a target pixel of the target image or to blend more than one of the specific pixels to determine the target pixel of the target image.

7. An image resizing method, comprising:
receiving at least one input image;
performing an image content analysis upon at least one image selected from the at least one input image to obtain an image content analysis result; and
creating a target image with a target image resolution by scaling the at least one input image according to the image content analysis result, wherein the target image resolution is smaller than an image resolution of the at least one input image.

8. The image resizing method of claim 7, wherein the step of creating the target image with the target image resolution comprises:
referring to the image content analysis result to determine a corresponding scaling kernel coefficient setting for each of a plurality of selected pixels in the at least one input image; and
creating the target image by processing each of the selected pixels in the at least one input image according to the corresponding scaling kernel coefficient setting.

9. The image resizing method of claim 7, wherein the step of creating the target image with the target image resolution comprises:
creating a super-resolution (SR) image from the at least one input image according to the image content analysis result; and
creating the target image by downscaling the SR image to the target image resolution.

10. The image resizing method of claim 7, wherein the image content analysis result includes local properties of a plurality of pixels located at a plurality of selected pixel positions in the at least one input image.

11. The image resizing method of claim 10, wherein at least one of the local properties includes a sharpness level or a blur level.

12. An image resizing apparatus, comprising:
an input circuit, arranged for receiving at least one input image;
a resizing circuit, arranged for scaling the at least one input image to different image resolutions to generate a plurality of scaled images, and obtaining a plurality of processed images derived from the scaled images, respectively, wherein an image resolution of each of the processed images is equal to a target image resolution, and the target image resolution is different from an image resolution of the at least one input image;

an image content analysis circuit, arranged for performing an image content analysis upon at least one image selected from the processed images and the at least one input image to obtain an image content analysis result; and a combining circuit, arranged for creating a target image with the target image resolution by combining pixels selected from the processed images according to the image content analysis result.

13. The image resizing apparatus of claim 12, wherein the resizing circuit downscales the at least one input image to the different image resolutions to generate a plurality of downscaled images acting as the scaled images.

14. The image resizing apparatus of claim 12, wherein:
when an image resolution of a scaled image is smaller than the target image resolution, the resizing circuit generates a processed image by upscaling the scaled image to the target image resolution; or
when the image resolution of the scaled image is larger than the target image resolution, the resizing circuit generates the processed image by downscaling the scaled image to the target image resolution; or
when the image resolution of the scaled image is equal to the target image resolution, the resizing circuit directly outputs the scaled image as the processed image.

15. The image resizing apparatus of claim 12, wherein the image content analysis result includes local properties corresponding to a plurality of pixels located at a plurality of pixel positions in the target image.

16. The image resizing apparatus of claim 15, wherein at least one of the local properties includes a sharpness level or a blur level.

17. The image resizing apparatus of claim 15, wherein regarding each of the pixel positions, the combining circuit refers to local properties corresponding to specific pixels located at the pixel position in the processed images to select one of the specific pixels as a target pixel of the target image or to blend more than one of the specific pixels to determine the target pixel of the target image.

18. An image resizing apparatus, comprising:
an input circuit, arranged for receiving at least one input image;
an image content analysis circuit, arranged for performing an image content analysis upon at least one image selected from the at least one input image to obtain an image content analysis result; and
a resizing circuit, arranged for creating a target image with a target image resolution by scaling the at least one input image according to the image content analysis result, wherein the target image resolution is smaller than an image resolution of the at least one input image.

19. The image resizing apparatus of claim 18, wherein the resizing circuit refers to the image content analysis result to determine a corresponding scaling kernel coefficient setting for each of a plurality of selected pixels in the at least one input image, and creates the target image by processing each of the selected pixels in the at least one input image according to the corresponding scaling kernel coefficient setting.

20. The image resizing apparatus of claim 18, wherein the resizing circuit creates a super-resolution (SR) image from the at least one input image according to the image content analysis result, and creates the target image by downscaling the SR image to the target image resolution.

21. The image resizing apparatus of claim 18, wherein the image content analysis result includes local properties of a plurality of pixels located at a plurality of selected pixel positions in the at least one input image.

22. The image resizing apparatus of claim 21, wherein at least one of the local properties includes a sharpness level or a blur level.

* * * * *